United States Patent
Lee et al.

(10) Patent No.: US 8,770,414 B2
(45) Date of Patent: Jul. 8, 2014

(54) REVERSE OSMOSIS MEMBRANE INCLUDING ULTRA-HYDROPHILIC PASSIVATION LAYER AND METHOD OF MANUFACTURING THE SAME

(71) Applicant: LG Chem, Ltd., Seoul (KR)

(72) Inventors: Young-Ju Lee, Daegu-si (KR); Chong-Kyu Shin, Daejeon-si (KR); Joung-Eun Yoo, Daejeon-si (KR); Seung-Pyo Jeong, Gwangju-si (KR); Phill Lee, Daejeon-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/920,739

(22) Filed: Jun. 18, 2013

(65) Prior Publication Data

US 2013/0284663 A1  Oct. 31, 2013

Related U.S. Application Data

(63) Continuation of application No. PCT/KR2012/004713, filed on Jun. 15, 2012.

(30) Foreign Application Priority Data

Jun. 17, 2011 (KR) .................. 10-2011-0059061
Jun. 14, 2012 (KR) .................. 10-2012-0063816

(51) Int. Cl.
*B01D 71/70* (2006.01)
*B05D 1/18* (2006.01)

(52) U.S. Cl.
CPC . *B01D 71/70* (2013.01); *B05D 1/18* (2013.01)
USPC ........... 210/490; 210/483; 210/488; 210/489; 210/500.21; 210/500.25; 210/506

(58) Field of Classification Search
CPC .............. B01D 71/70; B01D 2323/02; B01D 2325/36; B01D 61/02; B01D 61/025; B01D 67/0088; B01D 69/02; B01D 69/10; B01D 69/12; B01D 71/68
USPC ................... 210/483, 488, 489, 490, 500.21, 210/500.25, 506
See application file for complete search history.

(56) References Cited

U.S. PATENT DOCUMENTS

| 6,337,018 B1 | 1/2002 | Mickols |
| 6,551,536 B1 | 4/2003 | Kwak et al. |
| 2008/0237126 A1 | 10/2008 | Hoek |

FOREIGN PATENT DOCUMENTS

| JP | 2003-53163 | 2/2003 |
| JP | 2008-201812 | 9/2008 |
| KR | 10-2003-0001430 | 1/2003 |
| KR | 10-2010-0083700 | 7/2010 |

OTHER PUBLICATIONS

Fang, Jason et al., "Superhydrophilic and Solvent Resistant Coatings on Polypropylene Fabrics by a Simple Deposition Process"J. Mater. Chem., 2010, 20, 1651-1653.

*Primary Examiner* — John Kim
(74) *Attorney, Agent, or Firm* — McKenna Long & Aldridge, LLP

(57) ABSTRACT

A reverse osmosis separation membrane includes a porous support, a separation active layer formed on the supporting layer, and a ultra hydrophilic layer formed on the separation active layer. The ultra-hydrophilic layer includes a complex metal oxide including at least one metal element selected from the group consisting of Ti(IV), Zr(IV), Sn(IV) and Al(III), and Si, and an organic compound containing a hydrophilic group making a physical or chemical bond with Ti(IV), Zr(IV), Sn(IV) or Al(III) among the complex metal oxide. A method of manufacturing the reverse osmosis separation membrane also is provided. A reverse osmosis membrane including a single coating layer and having an improved durability, chlorine-resistance and antifouling properties may be provided.

14 Claims, No Drawings

REVERSE OSMOSIS MEMBRANE INCLUDING ULTRA-HYDROPHILIC PASSIVATION LAYER AND METHOD OF MANUFACTURING THE SAME

This application is a Continuation Bypass of International Application No. PCT/KR2012/004713 filed Jun. 15, 2012, and claims the benefit of Korean Application Nos. 10-2011-0059061 filed on Jun. 17, 2011 and 10-2012-0063816, filed Jun. 14, 2012 all of which are hereby incorporated by reference in their entirety for all purposes as if fully set forth herein.

BACKGROUND OF THE INVENTION

1. Field of the Invention

The present invention relates to a reverse osmosis membrane including an ultra-hydrophilic passivation layer and a method of manufacturing the same, and more particularly, to a reverse osmosis membrane having an improved performance thereof by forming an ultra-hydrophilic passivation layer on the reverse osmosis membrane, and a method of manufacturing the same.

2. Description of the Related Art

A reverse osmosis membrane may be applied in various industrial fields, for example, in desalting of brine, in preparing ultra-pure water, in treating environmental contamination, etc., and may be found in every daily life. As a membrane of the next generation, a membrane having a high quality including a polymer material having a particular function has been required. The function and properties of the material are necessary to be controlled minutely according to the application purpose of the membrane.

In order to improve the reverse osmosis membrane, a post-treating method using various chemical materials, a method of using an additive during forming a membrane may be used. According to the post-treating method, a plurality of reverse osmosis membranes is coated with polyvinyl alcohol (PVA) or a vinyl acetate homopolymer having a self-crosslinking functionality. Concerning the method of using the additive, a polymer additive may be used while forming various membranes, particularly, a nano filtering membrane to mix the polymer additive with the membrane.

As important improvements obtainable through modifying the exterior surface of the membrane, the stabilization of a separation member for conducting the separation of fouling while operating for a long time, and the increase of the degree of salt rejection for balancing the loss of the flowing amount due to the change of the membrane transferring characteristic, may be illustrated.

Generally, the upper layer of a reverse osmosis membrane is a ultra-thin barrier layer or a separation layer and includes cross-linked polyamide or polysulfone amide having a thickness of 10 to 100 nm. Generally, polyamide may be prepared by an interfacial polymerization method using m-phenylenediamine (MPD) in an aqueous phase and trimesoyl trichloride (TMC) in an organic phase.

The second layer or a middle layer commonly includes an engineering plastic such as polysulfone and commonly has a thickness of about 40 μm. The second layer provides the uppermost layer with a hard and smooth surface. The upper layer may be treated under such a high operation pressure, for example, 10 to 2,000 psi, due to the second layer.

The third layer or a base layer is commonly a non-woven polyester, for example, polyethylene terephthalate (PET) web and commonly has a thickness of about 120 μm. The third layer or the base layer is commonly very porous and irregular. Thus, the third layer may not provide the upper layer with an appropriate and direct support and so, may require the second layer or the middle layer.

A target of the research and industry on the reverse osmosis membrane field is improving or at least maintaining water flux without decreasing the degree of salt rejection for a long time to improve the efficiency of the membrane and the decrease of an operation cost. Instead of using uncertain novel chemicals, the importance on the surface modification on widely used polymers is strengthened. However, in this case, the most serious disadvantage is the fouling of the membrane inducing serious flux lowering during operation.

The main type of the fouling includes crystalline fouling such as a mineral scaling, a mineral deposition due to an excessive solution product, organic fouling such as the deposition of dissolved humic acid, oil, grease, etc., particle or colloidal fouling such as the deposition of clay, silt, a corrosive particle material, a debris and silica, and microbial fouling such as biofouling, attachment and accumulation of microorganism, and forming of a biofilm.

In order to decrease the fouling, various methods have been used. Generally, a plurality of coating layers is formed on the upper layer of the reverse osmosis membrane to modify the surface characteristic of the membrane through attaching a hydrophobic group or a hydrophilic group, and an electrically negative group or an electrically positive group, etc.

When an additional layer of the above-described diverse materials is formed to improve the reverse osmosis membrane, the thickness of the membrane may become large, and the maximization of target characteristics may become difficult due to the overlap of the coating layers including different materials.

SUMMARY OF THE INVENTION

An aspect of the present invention provides a reverse osmosis separation layer having increased durability, chlorine-resistance and antifouling properties by a single coating layer of a ultra-hydrophilic passivation layer on one side of the membrane.

Another aspect of the present invention provides a method of manufacturing a reverse osmosis membrane having increased durability, chlorine-resistance and antifouling properties through coating a single layer of a ultra-hydrophilic passivation layer on one side of the membrane.

According to an aspect of the present invention, there is provided a reverse osmosis separation membrane including a porous support, a separation active layer formed on the supporting layer, and a ultra hydrophilic layer formed on the separation active layer. The ultra-hydrophilic layer includes a complex metal oxide including at least one metal element selected from the group consisting of Ti(IV), Zr(IV), Sn(IV) and Al(III), and Si; and an organic compound containing a hydrophilic group making a physical or chemical bond with Ti(IV), Zr(IV), Sn(IV) or Al(III) among the complex metal oxide.

The complex metal oxide may have a meso-porous structure, and may preferably have a hollow tube type meso-porous structure.

The hollow tube type meso-porous structure may include an organic compound containing a hydrophilic group through a physical or chemical bond.

In addition, the ultra-hydrophilic layer may include a compound having a structure represented by the following Chemical Formula 6.

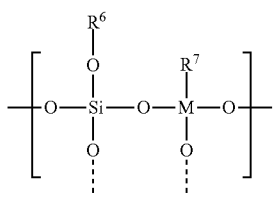

[Chemical Formula 6]

In Chemical Formula 6, M represents Ti(IV), Zr(IV), Sn(IV) or Al(III), $R^6$ represents hydrogen, a $C_{1-20}$ alkyl group, $C_nH_{2n}$—OH, or $C_nH_{2n}$—CHCH$_2$O (in which, n represents an integer of 1 to 20), and $R^7$ represents a functional group originated from an organic compound containing the hydrophilic group.

In this case, the hydrophilic group of the organic compound containing the hydrophilic compound may preferably be at least one selected from the group consisting of a sulfonate salt, sulfuric acid, a carboxylate salt, carboxylic acid, a phosphate salt, phosphoric acid and a hydroxyl group (OH).

The organic compound containing the hydrophilic group may include at least one functional group selected from the group consisting of a hydroxyl group (OH), an amine group and a phosphate, the functional group possibly making a physical or chemical bond with Ti(IV), Zr(IV), Sn(IV) or Al(III) among the complex metal oxide.

The organic compound containing the hydrophilic group may be a chelating agent possibly making a coordination bond with Ti(IV), Zr(IV), Sn(IV) or Al(III) among the complex metal oxide.

More particularly, the organic compound containing the hydrophilic group may be at least one selected from the group consisting of disodium 1,2-dihydroxybenzene-3,5-disulfonate, sodium 1,2-dihydroxy-3-sulfonate, sodium 1,2-dihydroxy-4-sulfonate, sodium 1,2-dihydroxy-5-sulfonate, disodium 1,2-dihydroxy-4-chlorobenzene-3,5-disulfonate, disodium 1,2-dihydroxy-6-chlorobenzene-3,5-disulfonate, 1,2-dihydroxybenzene-3,5-disulfonic acid, 1,2-dihydroxy-3-sulfonic acid, 1,2-dihydroxy-4-sulfonic acid, 1,2-dihydroxy-5-sulfonic acid, 1,2-dihydroxy-4-chlorobenzene-3,5-disulfonic acid, 1,2-dihydroxy-6-chlorobenzene-3,5-disulfonic acid, disodium 1,2-dihydroxybenzene-3,5-dicarboxylate, sodium 1,2-dihydroxy-3-carboxylate, sodium 1,2-dihydroxy-4-carboxylate, sodium 1,2-dihydroxy-5-carboxylate, disodium 1,2-dihydroxy-4-chlorobenzene-3,5-dicarboxylate, disodium 1,2-dihydroxy-6-chlorobenzene-3,5-dicarboxylate, 1,2-dihydroxybenzene-3,5-dicarboxylic acid, 1,2-dihydroxy-3-carboxylic acid, 1,2-dihydroxy-4-carboxylic acid, 1,2-dihydroxy-5-carboxylic acid, 1,2-dihydroxy-4-chlorobenzene-3,5-dicarboxylic acid, 1,2-dihydroxy-6-chlorobenzene-3,5-dicarboxylic acid, disodium 1,2-dihydroxybenzene-3,5-diphosphate, sodium 1,2-dihydroxy-3-phosphate, sodium 1,2-dihydroxy-4-phosphate, sodium 1,2-dihydroxy-5-phosphate, disodium 1,2-dihydroxy-4-chlorobenzene-3,5-diphosphate, disodium 1,2-dihydroxy-6-chlorobenzene-3,5-diphosphate, 1,2-dihydroxybenzene-3,5-diphosphoric acid, 1,2-dihydroxybenzene-3-phosphoric acid, 1,2-dihydroxybenzene-4-phosphoric acid, 1,2-dihydroxybenzene-5-phosphoric acid, 1,2-dihydroxy-4-chlorobenzene-3,5-diphosphoric acid, 1,2-dihydroxy-6-chlorobenzene-3,5-diphosphoric acid, dihexadecyl phosphate, monododecyl phosphate, and nafion (tetrafluoroethylene-perfluoro-3,6-dioxa-4-methyl-7-octenesulfonic acid copolymer).

The complex metal oxide having the meso-porous structure may be prepared by a polymerization reaction of a precursor including at least one element selected from the group consisting of Si, Ti(IV), Zr(IV), Sn(IV) and Al(III) in the presence of a solvent and a surfactant.

The solvent may be at least one selected from the group consisting of ethanol, water, isopropyl alcohol, methanol and ethyl acetate.

The surfactant may be a nonionic surfactant represented by the following Chemical Formula 3 or an ionic surfactant represented by the following Chemical Formula 4.

[Chemical Formula 3]

In Chemical Formula 3, x=5-40%, y=90-20%, 2x+y=100%, EO represents ethylene oxide, and PO represents propylene oxide.

[Chemical Formula 4]

In Chemical Formula 4, n=12 to 18, and $X_1$=Cl or Br.

The ultra-hydrophilic layer may further include a silane coupling agent.

The ultra-hydrophilic layer may further include a multi-functional organic material represented by the following Chemical Formula 5.

[Chemical Formula 5]

In Chemical Formula 5, EO represents ethylene oxide, k represents an integer of 3 to 400, $R^3$ is selected from OH, (meth)acrylate having $C_1$ to $C_{15}$, di(meth)acrylate having $C_1$ to $C_{15}$, tri(meth)acrylate having $C_1$ to $C_{15}$, or vinyl having $C_1$ to $C_{15}$, $R^4$ is selected from hydrogen, (meth)acrylate having $C_1$ to $C_3$, and vinyl having $C_1$ to $C_3$.

According to another embodiment of the present invention, there is provided a method of manufacturing a reverse osmosis separation membrane. The method includes forming a separation active layer by interfacial polymerization on a porous support. Then, a ultra-hydrophilic layer is formed by a complex metal oxide including at least one metal element selected from the group consisting of Ti(IV), Zr(IV), Sn(IV) and Al(III), and Si, and an organic compound containing a hydrophilic group making a physical or chemical bond with Ti(IV), Zr(IV), Sn(IV) or Al(III) among the complex metal oxide.

The forming of the ultra-hydrophilic layer may be conducted by a dipping process.

DETAILED DESCRIPTION OF THE INVENTION

Hereinafter, Embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The inventors of the present invention have undertaken research on developing a reverse osmosis membrane having an improved durability, antifouling properties and chlorine-resistance without applying a multi-coating, and found that a reverse osmosis separation membrane having a good membrane characteristic would be manufactured only with a single coating when a ultra-hydrophilic layer including a complex metal oxide and an organic compound containing a hydrophilic group is formed on a separation active layer, to complete the present invention.

More particularly, the present invention relates to a reverse osmosis separation membrane including a porous support, a separation active layer formed on the porous support and a ultra-hydrophilic layer formed on the separation active layer.

In exemplary embodiments, the porous support preferably includes a polymer having a sulfonic acid group. The polymer having the sulfonic acid group may be at least one selected from the group consisting of polysulfone, polyether sulfone, polyaryl sulfone, polyalkyl sulfone, polyaralkyl sulfone, polyphenyl sulfone and polyether ether sulfone.

The separation active layer preferably includes polyamide formed by interfacial polymerization.

The ultra-hydrophilic layer includes a complex metal oxide including at least one metal element selected from the group consisting of Ti(IV), Zr(IV), Sn(IV) and Al(III), and Si; and an organic compound containing a hydrophilic group making a physical or chemical bond with Ti(IV), Zr(IV), Sn(IV) or Al(III) among the complex metal oxide. When physically or chemically combining the hydrophilic complex metal oxide with the organic compound containing the hydrophilic group, hydrophilicity may be increased.

The complex metal oxide may have a meso-porous structure or a hollow tube type meso-porous structure. Further, the organic compound containing the hydrophilic group may preferably be combined through a physical or chemical bond in the complex metal oxide having the hollow tube type meso-porous structure.

For example, the complex metal oxide and the organic compound containing the hydrophilic group may have a structure represented by the following Chemical Formula 6 and may be present on the ultra-hydrophilic layer.

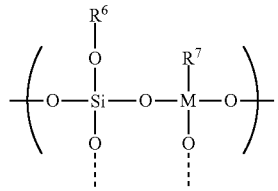

[Chemical Formula 6]

In Chemical Formula 6, M represents Ti(IV), Zr(IV), Sn(IV) or Al(III), $R^6$ represents hydrogen, a $C_{1-20}$ alkyl group, $-C_nH_{2n}-OH$, or $-C_nH_{2n}-CHCH_2O$ (in which, n represents an integer of 1 to 20), and $R^7$ represents a functional group originated from an organic compound containing a hydrophilic group. Particularly preferably, $R^6$ represents $-C_nH_{2n}-OH$, or $-C_nH_{2n}-CHCH_2O$ (in which, n represents an integer of 1 to 20).

In exemplary embodiments, the organic compound containing the hydrophilic group may be a substituted or unsubstituted aromatic compound of $C_5$ to $C_{30}$ or a saturated or unsaturated aliphatic compound. The substituted or unsubstituted and saturated or unsaturated aliphatic compound may also include a polymer or a copolymer thereof.

The hydrophilic group of the organic compound containing the hydrophilic compound may be at least one selected from the group consisting of a sulfonate salt, sulfuric acid, a carboxylate salt, carboxylic acid, a phosphate salt, phosphoric acid and a hydroxyl group (OH). The organic compound containing the hydrophilic group includes at least one functional group selected from the group consisting of a hydroxyl group (OH), an amine group and a phosphate. The functional group may possibly make a physical or chemical bond with Ti(IV), Zr(IV), Sn(IV) or Al(III) among the complex metal oxide. For example, the organic compound containing the hydrophilic group may be a chelating agent possibly making a coordination bond with Ti(IV), Zr(IV), Sn(IV) or Al(III) among the complex metal oxide.

More particularly, the organic compound containing the hydrophilic group may be at least one selected from the group consisting of disodium 1,2-dihydroxybenzene-3,5-disulfonate, sodium 1,2-dihydroxy-3-sulfonate, sodium 1,2-dihydroxy-4-sulfonate, sodium 1,2-dihydroxy-5-sulfonate, disodium 1,2-dihydroxy-4-chlorobenzene-3,5-disulfonate, disodium 1,2-dihydroxy-6-chlorobenzene-3,5-disulfonate, 1,2-dihydroxybenzene-3,5-disulfonic acid, 1,2-dihydroxy-3-sulfonic acid, 1,2-dihydroxy-4-sulfonic acid, 1,2-dihydroxy-5-sulfonic acid, 1,2-dihydroxy-4-chlorobenzene-3,5-disulfonic acid, 1,2-dihydroxy-6-chlorobenzene-3,5-disulfonic acid, disodium 1,2-dihydroxybenzene-3,5-dicarboxylate, sodium 1,2-dihydroxy-3-carboxylate, sodium 1,2-dihydroxy-4-carboxylate, sodium 1,2-dihydroxy-5-carboxylate, disodium 1,2-dihydroxy-4-chlorobenzene-3,5-dicarboxylate, disodium 1,2-dihydroxy-6-chlorobenzene-3,5-dicarboxylate, 1,2-dihydroxybenzene-3,5-dicarboxylic acid, 1,2-dihydroxy-3-carboxylic acid, 1,2-dihydroxy-4-carboxylic acid, 1,2-dihydroxy-5-carboxylic acid, 1,2-dihydroxy-4-chlorobenzene-3,5-dicarboxylic acid, 1,2-dihydroxy-6-chlorobenzene-3,5-dicarboxylic acid, disodium 1,2-dihydroxybenzene-3,5-diphosphate, sodium 1,2-dihydroxy-3-phosphate, sodium 1,2-dihydroxy-4-phosphate, sodium 1,2-dihydroxy-5-phosphate, disodium 1,2-dihydroxy-4-chlorobenzene-3,5-diphosphate, disodium 1,2-dihydroxy-6-chlorobenzene-3,5-diphosphate, 1,2-dihydroxybenzene-3,5-diphosphoric acid, 1,2-dihydroxybenzene-3-phosphoric acid, 1,2-dihydroxybenzene-4-phosphoric acid, 1,2-dihydroxybenzene-5-phosphoric acid, 1,2-dihydroxy-4-chlorobenzene-3,5-diphosphoric acid, 1,2-dihydroxy-6-chlorobenzene-3,5-diphosphoric acid, dihexadecyl phosphate, monododecyl phosphate, and nafion (tetrafluoroethylene-perfluoro-3,6-dioxa-4-methyl-7-octenesulfonic acid copolymer).

The complex metal oxide may be prepared by following. A silane compound represented by the following Chemical Formula 1 may be dissolved into an organic solvent. Then, a small amount of water and an acid may be added to hydrolyze the silane compound to form a silica dispersion. Into the silica dispersion, a compound represented by the following Chemical Formula 2 or mixtures thereof may be added to conduct a polymerization reaction, for example, a sol-gel reaction to form the complex metal oxide. The complex metal oxide may be obtained by a polymerization reaction, for example, a sol-gel reaction of the silane compound represented by the following Chemical Formula 1 and the compound represented by the following Chemical Formula 2 or mixtures thereof.

$$R'_{4-n}SiR_n$$ <span>[Chemical Formula 1]</span>

In Chemical Formula 1, R is independently selected from a $C_1$ to $C_6$ alkoxy group, a hydroxyl group (OH), or a halogen element, n represents an integer of 1 to 4, and R' is independently selected from a $C_1$ to $C_6$ alkyl group including or excluding an unsaturated functional group, a vinyl group and hydrogen (H).

$$A_aB_bO_c$$ <span>[Chemical Formula 2]</span>

In Chemical Formula 2, A represents Ti(IV), Zr(IV), Sn(IV) and Al(III), B represents a halogen, a hydroxyl group (OH), a $C_1$ to $C_6$ alkoxy group, or a $C_5$ to $C_{10}$ β-diketonate, a represents 1 or 2, b represents 4, 3 or 2, and c represents 0 or 1.

The complex metal oxide having the meso-porous structure may be prepared by a polymerization reaction of precursor including at least one element selected from the group consisting of Si, Ti(IV), Zr(IV), Sn(IV) and Al(III) in the presence of a solvent and a surfactant. In this case, the solvent may be at least one selected from the group consisting of ethanol, water, isopropyl alcohol, methanol and ethyl acetate. In addition, the surfactant may be a nonionic surfactant represented by the following Chemical Formula 3 or an ionic surfactant represented by the following Chemical Formula 4.

$$EO_xPO_yEO_x \qquad \text{[Chemical Formula 3]}$$

In Chemical Formula 3, x=5-40%, y=90-20%, 2x+y=100%, EO represents ethylene oxide, and PO represents propylene oxide.

$$(C_nH_{2n+1})(CH_3)_3NX_1 \qquad \text{[Chemical Formula 4]}$$

In Chemical Formula 4, n=12 to 18, and $X_1$=Cl or Br.

The ultra-hydrophilic layer may further include, without limitation, a silane coupling agent possibly making a reaction with Si—OH of silica in the complex metal oxide (silica-metal oxide) in accordance with the present inventive concept. Particularly, the silane coupling agent may be cured by ultraviolet and heat. Through adding the silane coupling agent, the surface adhesiveness of the hydrophilic layer may be further increased.

In addition, the ultra-hydrophilic layer may further include a multi-functional organic material curable by ultraviolet and heat and represented by following Chemical Formula 5 in order to improve the interfacial adhesiveness, the durability and the mechanical stability of the complex metal oxide (silica-metal oxide).

$$R^3(EO)_kR^4 \qquad \text{[Chemical Formula 5]}$$

In Chemical Formula 5, EO represents ethylene oxide, k represents an integer of 3 to 400, $R^3$ is selected from OH, (meth)acrylate having $C_1$ to $C_{15}$, di(meth)acrylate having $C_1$ to $C_{15}$, tri(meth)acrylate having $C_1$ to $C_{15}$, or vinyl having $C_1$ to $C_{15}$, $R^4$ is selected from hydrogen, (meth)acrylate having $C_1$ to $C_3$, or vinyl having $C_1$ to $C_3$.

Hereinafter, a method of manufacturing a reverse osmosis separation membrane will be described.

The reverse osmosis separation membrane in exemplary embodiments may be formed by forming a separation active layer by interfacial polymerization on a porous support; and forming a ultra-hydrophilic layer including a complex metal oxide including at least one metal element selected from the group consisting of Ti(IV), Zr(IV), Sn(IV) and Al(III), and Si, and an organic compound containing a hydrophilic group making a physical or chemical bond with Ti(IV), Zr(IV), Sn(IV) or Al(III) among the complex metal oxide. In this case, the components and the structure of the porous support, the separation active layer and the ultra-hydrophilic layer are as described above.

The forming of the separation active layer preferably includes dipping the porous support into a solution including a least one multi-functional amine selected from m-phenylenediamine, p-phenylenediamine and piperazine, and then dipping into a solution including at least one multi-functional halogen selected from trimesoyl chloride (TMC), isophthaloyl chloride (IPC) and terephthaloyl chloride (TPD), to form a polyamide separation active layer by interfacial polymerization.

The ultra-hydrophilic layer may be manufactured by dipping the support into a solution, preferably, an aqueous solution, including the ultra-hydrophilic composition as described above. Preferably, an aqueous solution of 0.1 to 5 wt % is used. When the aqueous solution of less than 0.1 wt % is used, the sol-gel reaction of the ultra-hydrophilic layer may not be conducted on the whole polyamide layer to form a partial ultra-hydrophilic passivation layer. In addition, the maximum accomplishment of the performance, the antifouling properties and the chlorine-resistance may become difficult. When the aqueous solution exceeding 5 wt % is used, too thick ultra-hydrophilic passivation layer may be formed on the polyamide layer and the flux may be decreased. In addition, when the aqueous solution of 1.5 wt % to 2.5 wt % is used, a good salt rejection may be obtained while maintaining the initial flux amount as found in Table 1.

The preferred dipping time is 1 to 10 minutes. When the dipping time is less than 1 minute, the polyamide layer may not be wholly covered but may be partially covered with the ultra-hydrophilic material. When the dipping time exceeds 10 minutes, the ultra-hydrophilic material may make an aggregation, and the thickness of the layer may become large. In addition, the ultra-hydrophilic material may be non-uniformly attached onto the polyamide layer.

Then, heat treatment may be conducted at 60° C. to 100° C. for 1 to 10 minutes, and a drying process may be conducted to manufacture the ultra-hydrophilic passivation layer. When the heat treatment temperature is less than 60° C., the sol-gel reaction may not be completed, and the whole polyamide layer may not be covered. In addition, unreacted materials may be washed out at a last washing step. When the heat treatment temperature exceeds 100° C., the support and the polyamide layer may be damaged.

The reverse osmosis separation membrane in accordance with the present inventive concept has a good flux characteristic and antifouling properties due to the hydrophilic chemistry illustrated by the ultra-hydrophilic layer when comparing with a common reverse osmosis membrane.

In addition, diverse functionalization may be possible because of the functional groups present at the surface of the ultra-hydrophilic layer such as an —OH group, and a remarkable performance improvement may be obtainable through forming a single coating layer. Further, since the ultra-hydrophilic layer makes a chemical bond with polyamide, the chlorine-resistance also may be improved. Generally, different materials have been used to improve the antifouling properties and the chlorine-resistance in a common membrane. In this case, a coating process through a plurality of steps may be necessary. In addition, the plurality of the coating layers may be overlapped to deteriorate the separation membrane characteristic, and the manufacturing process may become complicated. In exemplary embodiments, the above defects may be solved. The antifouling properties and the chlorine-resistance may be improved at the same time by means of one coating layer. Since the reverse osmosis membrane in accordance with exemplary embodiments include only one coating layer, the manufacturing process may be simple, and the deterioration of the membrane performance due to the coating layer may be minimized.

Hereinafter, the present invention will be explained in more detail referring to example embodiments. However, the following examples are only for illustration, and the scope of the present invention should not be limited by the following examples.

EXAMPLES

Preparation Example 1

Manufacture of Reverse Osmosis Separation Membrane

On a non-woven fabric of a polyester material and having a thickness of 95 to 100 μm, prepared polysulfone was cast in order to use as a reverse osmosis separation membrane. In order to cast polysulfone, 18 wt % of polysulfone solid content was added into an N,N-dimethylformamide (DMF) solution and dissolved at 80° C. to 85° C. for 12 hours or over to obtain a homogeneous liquid phase solution. The liquid polysulfone was cast to a thickness of 45 to 50 μm on the non-woven fabric.

The thus prepared porous polysulfone support was dipped into an aqueous solution including 2 wt % of m-phenylenediamine (MDP) for 2 minutes. Then, an excessive amount of the aqueous solution on the support was removed by using a 25 psi roller. The support was dried at room temperature for 1 minute.

The thus coated support was dipped in a solution including Isol C solvent (SKC Corp.) and 0.1 vol % of 1,3,5-benzenetricarbonyl trichloride (TMC) for 1 minute. Then, the support was dried in an oven at 60° C. for 10 minutes to remove an excessive amount of the organic solution.

The separation membrane manufactured by the above-described method was washed in a 0.2 wt % of an aqueous sodium carbonate solution at room temperature for 2 hours or over and was washed using distilled water. A polyamide layer having a thickness of 200 μm was manufactured by the above-described method to manufacture a separation membrane.

Preparation Example 2

Preparation of Composition for Ultra-hydrophilic Layer 100 g of ethanol and 100 g of tetraethyl orthosilicate (Si(OCH$_2$CH$_3$)$_4$, TEOS) were mixed, and 50 g of water (H$_2$O) and 5 mL of HCl were added and reacted for about 30 minutes. 80 g of ethanol and 57.5 g of P123 (ethylene oxide/propylene oxide block copolymer, Mn-5,800) were mixed to prepare a silica solution. Into the silica solution, 7 mL of titanium chloride (TiCl$_4$) dissolved in 50 g of water was mixed and 5 g of Tiron (4,5-dihydroxy-m-benzenesulfonic acid, disodium salt) dissolved in 20 g of water (H$_2$O) were mixed to prepare a hydrophilic composition including an Si—Ti complex metal oxide and a compound containing a hydrophilic group. In this case, the mol ratio of Ti/Si was 1/10.

Experiment 1

Evaluation on Water Contact Angle

After washing the reverse osmosis separation membrane manufactured in Preparation Example 1, the separation membrane was dipped into the hydrophilic composition prepared in Preparation Example 2 at room temperature for 1 minute and was treated in an oven at 80° C. for 10 minutes to form a ultra-hydrophilic coating layer on the surface of the membrane.

After forming the ultra-hydrophilic coating layer, a water contact angle was measured by using a Contact angle goniometry (PSA 100, KRUSS GmbH). A water drop was dropped on a measuring surface by means of a 3 μl microinjector. The contact angle of five water drops on the measuring surface was measured by means of a microscope, and the mean value of the water contact angles was selected as the result of the water contact angle. From the result, the water contact angle was obtained as 23.6±2.1°.

Example 1

The polyamide layer was washed using distilled water and then dried at room temperature. Then, the polyamide layer was dipped into a 0.05 M potassium persulfate solution for 30 minutes. After that, the polyamide layer was dipped into a 0.5 wt % of an aqueous solution (solvent; ethanol) of the composition prepared in Preparation Example 2 at room temperature for 1 minute, and was treated in an oven at 80° C. for 10 minutes to form a ultra-hydrophilic coating layer on the surface of the polyamide layer. The surface of the thus obtained membrane was washed using distilled water, and the performance of the membrane was measured in an aqueous NaCl solution of 32,000 ppm at a pressure of 800 psi. The results are illustrated in Table 1.

Example 2

The same procedure as explained in Example 1 was conducted except for using 1 wt % of the composition prepared in Preparation Example 2 instead of using 0.5 wt % as in Example 1. The evaluation on the performance of the membrane was conducted by the same manner under the same condition as described in Example 1. The physical properties of the complex layer are illustrated in Table 1.

Example 3

The same procedure as explained in Example 1 was conducted except for using 1.5 wt % of the composition prepared in Preparation Example 2 instead of using 0.5 wt % as in Example 1. The evaluation on the performance of the membrane was conducted by the same manner under the same condition as described in Example 1. The physical properties of the conducted complex layer are illustrated in Table 1.

Example 4

The same procedure as explained in Example 1 was conducted except for using 2 wt % of the composition prepared in Preparation Example 2 instead of using 0.5 wt % as in Example 1. The evaluation on the performance of the membrane was conducted by the same manner under the same condition as described in Example 1. The physical properties of the conducted complex layer are illustrated in Table 1.

Example 5

The same procedure as explained in Example 1 was conducted except for using 2.5 wt % of the composition prepared in Preparation Example 2 instead of using 0.5 wt % as in Example 1. The evaluation on the performance of the membrane was conducted by the same manner under the same condition as described in Example 1. The physical properties of the conducted complex layer are illustrated in Table 1.

Example 6

The same procedure as explained in Example 1 was conducted except for using 3 wt % of the composition prepared in Preparation Example 2 instead of using 0.5 wt % as in Example 1. The evaluation on the performance of the membrane was conducted by the same manner under the same condition as described in Example 1. The physical properties of the conducted complex layer are illustrated in Table 1.

Comparative Example 1

After washing the polyamide layer, no surface treatment was conducted. The evaluation on the performance of the membrane was conducted by the same manner under the same condition as described in Example 1. The physical properties of the complex layer are illustrated in Table 1.

Comparative Example 2

After washing using distilled water, the polyamide layer was dried at room temperature. Then, the polyamide layer was dipped into a 0.05 M potassium persulfate solution for 30 minutes. After that, the polyamide layer was dipped into a 0.5 wt % of an aqueous glycidoxypropyl silane solution at room temperature for 1 minute and was treated in an oven at 80° C. for 10 minutes to form a coating layer on the surface of the membrane, improving the chlorine-resistance. The surface of the thus obtained layer was washed using distilled water, was dipped into a 0.5 wt % of an aqueous PVA solution at room temperature for 1 minute, and treated in an oven at 80° C. for 10 minutes to form a coating layer improving the antifouling properties. The surface of the thus obtained layer was washed using distilled water and the performance of the membrane was measured in an aqueous NaCl solution of 32,000 ppm at a pressure of 800 psi. The results are illustrated in Table 1.

Experiment 2

Evaluation on Initial Salt Rejection and Initial Permeation Flux

The initial salt rejection and the initial permeation flux were measured by using an aqueous NaCl solution of 32,000 ppm in a flowing amount of 1,400 ml/min at 25° C. A reverse osmosis membrane cell apparatus used for the evaluation on the membranes includes a flat type transmission cell, a high pressure pump, a storing bath and a cooling apparatus. The structure of the flat type transmission cell was cross-flow type, and an effective transmission area was 140 cm$^2$.

After installing a washed reverse osmosis membrane onto the transmission cell, a preliminary operation was conducted sufficiently for about 1 hour by using thirdly distilled water to stabilize the evaluation apparatus. Then, the aqueous sodium chloride solution of 32,000 ppm was supplied, and an apparatus operation was conducted for about 1 hour until the pressure and the permeation flux reached a stationary state. Then, the amount of water permeation for 10 minutes was measured, and the flux was calculated. The salt rejection was calculated by analyzing the concentration of the salt before and after the permeation by using a conductivity meter.

TABLE 1

| Separation membrane | Initial salt rejection (%) | Initial permeation flux (GFD) |
|---|---|---|
| Example 1 | 96.65 | 17.85 |
| Example 2 | 97.05 | 17.49 |
| Example 3 | 97.74 | 17.56 |
| Example 4 | 98.31 | 17.46 |
| Example 5 | 98.35 | 15.76 |
| Example 6 | 98.84 | 14.18 |
| Comparative Example 1 | 96.00 | 18.31 |
| Comparative Example 2 | 91.37 | 10.25 |

As found in Table 1, the initial salting rejection of the separation membranes coated with the ultra-hydrophilic material in accordance with Examples 1 to 6 of the present invention were improved when comparing with the uncoated separation membrane in Comparative Example 1. With respect to the permeation flux, not much difference was found. For the membrane including a plurality of coating layers according to Comparative Example 2, the initial salt rejection and the initial permeation flux were found to be remarkably lowered. The best salt rejection was obtained while maintaining the initial permeation flux for the membrane coated with 2 wt % of the composition prepared in Preparation Example 2 as in Example 4.

Experiment 3

Evaluation on Chlorine-resistance

The evaluation on the chlorine-resistance was conducted by using a mixture solution of an aqueous NaCl solution of 32,000 ppm and NaOCl of 2,000 ppm. In order to exclude the penetration of chlorine and the salt through the non-woven fabric, the support of the reverse osmosis complex layer and the polysulfone layer, the mixture solution was flown in an evaluation apparatus for 10 to 30 seconds. Then, a stationary state was maintained so as to induce the penetration of the salt only into the surface of polyamide. The salt rejection and the flux change were measured according to time.

A complex layer was manufactured as the same method described in Example 4 and Comparative Example 1. Immediately after mixing an aqueous NaCl solution of 32,000 ppm and an aqueous NaOCl solution of 2,000 ppm, the performance of the complex layer was evaluated after operating the evaluation apparatus at the pressure of 800 psi. After the measuring, the complex layer was mounted on the evaluation apparatus under the same condition for 6 hours, and for 12 hours. Then, the performance of the complex layer was evaluated with the pressure of 800 psi. The results are illustrated in Tables 2 and 3.

TABLE 2

| Division | Initial salt rejection after adding NaOCl (%) | Salt rejection after 6 hours of exposing to NaOCl (%) | Salt rejection after 12 hours of exposing to NaOCl (%) |
|---|---|---|---|
| Example 4 | 98.25 | 98.14 | 98.01 |
| Comparative Example 1 | 96.03 | 93.27 | 76.39 |

TABLE 3

| Division | Initial flux after adding NaOCl (GFD) | Flux after 6 hours of exposing to NaOCl (GFD) | Flux after 12 hours of exposing to NaOCl (GFD) |
|---|---|---|---|
| Example 4 | 17.52 | 18.35 | 19.84 |
| Comparative Example 1 | 18.38 | 23.08 | 32.15 |

Experiment 4

Evaluation on Antifouling Properties

The evaluation on the antifouling properties was conducted by using a mixture solution of an aqueous NaCl solution of 32,000 ppm and an aqueous casein solution of 100 ppm. After evaluating the initial salt rejection and the initial permeation flux, the aqueous casein solution of 100 ppm was put into an evaluation tank. Immediately after that, the salt rejection and the permeation flux change were measured. The casein for the evaluation of the antifouling properties was used after dissolving casein including protein the most into an aqueous solution of pH of 11 or over.

A complex layer was manufactured as the same method described in Example 4 and Comparative Example 1. The performance of the complex layer was evaluated by using an aqueous mixture solution of an aqueous NaCl solution of 32,000 ppm and casein of 100 ppm with the pressure of 800 psi, before and after the addition of the aqueous casein solution. The measured results are illustrated in Table 4.

TABLE 4

| Division | Initial salt rejection before adding casein (%) | Salt rejection after 2 hours of adding casein (%) | Initial flux before adding casein (GFD) | Flux after 2 hours of adding casein (GFD) |
|---|---|---|---|---|
| Example 8 | 98.27 | 98.43 | 17.56 | 17.48 |
| Comparative Example 1 | 96.12 | 95.97 | 18.28 | 15.08 |

As illustrated in Tables 2 to 4, a polyamide complex layer coated on a ultra-hydrophilic layer in accordance with exemplary embodiments may have improved chlorine-resistance and antifouling property at the same time. Since the coated layer with a hydrophilic material has a strong durability with respect to a detergent such as NaOCl used to decrease the fouling and decreases the fouling degree of the surface of the membrane, the coated layer may be applied in a reverse osmosis membrane in a seawater desalination equipment.

According to exemplary embodiments, a reverse osmosis membrane having improved durability, chlorine-resistance and antifouling properties may be manufactured through a single coating.

While the present invention has been shown and described in connection with the embodiments, it will be apparent to those skilled in the art that modifications and variations can be made without departing from the spirit and scope of the invention as defined by the appended claims.

What is claimed is:

1. A reverse osmosis separation membrane, comprising a porous support, a separation active layer formed on the supporting layer, and a ultra hydrophilic layer formed on the separation active layer,
   the ultra-hydrophilic layer comprising a complex metal oxide including at least one metal element selected from the group consisting of Ti(IV), Zr(IV), Sn(IV) and Al (III), and Si; and an organic compound containing a hydrophilic group making a physical or chemical bond with Ti(IV), Zr(IV), Sn(IV) or Al(III) among the complex metal oxide.

2. The reverse osmosis separation membrane of claim 1, wherein the complex metal oxide has a meso-porous structure.

3. The reverse osmosis separation membrane of claim 1, wherein the complex metal oxide has a hollow tube type meso-porous structure.

4. The reverse osmosis separation membrane of claim 3, wherein the hollow tube type meso-porous structure includes an organic compound containing a hydrophilic group through a physical or chemical bond.

5. The reverse osmosis separation membrane of claim 1, wherein the ultra-hydrophilic layer includes a compound having a structure represented by following Chemical Formula 6.

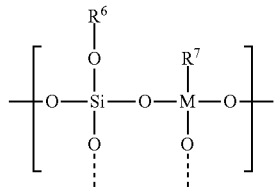

[Chemical Formula 6]

in Chemical Formula 6.
M represents Ti(IV), Zr(IV), Sn(IV) or Al(III),
$R^6$ represents hydrogen, a $C_{1-20}$ alkyl group, $C_nH_{2n}$—OH, or $C_nH_{2n}$—CHCH$_2$O (in which, n represents an integer of 1 to 20), and
$R^7$ represents a functional group originated from an organic compound containing the hydrophilic group.

6. The reverse osmosis separation membrane of claim 1, wherein the hydrophilic group of the organic compound containing the hydrophilic compound is at least one selected from the group consisting of a sulfonate salt, sulfuric acid, a carboxylate salt, carboxylic acid, a phosphate salt, phosphoric acid and a hydroxyl group (OH).

7. The reverse osmosis separation membrane of claim 1, wherein the organic compound containing the hydrophilic group includes at least one functional group selected from the group consisting of a hydroxyl group (OH), an amine group and a phosphate, the functional group possibly making a physical or chemical bond with Ti(IV), Zr(IV), Sn(IV) or Al(III) among the complex metal oxide.

8. The reverse osmosis separation membrane of claim 1, wherein the organic compound containing the hydrophilic group is a chelating agent possibly making a coordination bond with Ti(IV), Zr(IV), Sn(IV) or Al(III) among the complex metal oxide.

9. The reverse osmosis separation membrane of claim 1, wherein the organic compound containing the hydrophilic group is at least one selected from the group consisting of disodium 1,2-dihydroxybenzene-3,5-disulfonate, sodium 1,2-dihydroxy-3-sulfonate, sodium 1,2-dihydroxy-4-sulfonate, sodium 1,2-dihydroxy-5-sulfonate, disodium 1,2-dihydroxy-4-chlorobenzene-3,5-disulfonate, disodium 1,2-dihydroxy-6-chlorobenzene-3,5-disulfonate, 1,2-dihydroxybenzene-3.5-disulfonic acid, 1,2-dihydroxy-3-sulfonic acid. 1,2-dihydroxy-4-sulfonic acid, 1,2-dihydroxy-5-sulfonic acid, 1,2-dihydroxy-4-chlorobenzene-3,5-disulfonic acid, 1,2-dihydroxy-6-chlorobenzene-3,5-disulfonic acid, disodium 1,2-dihydroxybenzene-3,5-dicarboxylate, sodium 1,2-dihydroxy-3-carboxylate, sodium 1,2-dihydroxy-4-carboxylate, sodium 1,2-dihydroxy-5-carboxylate, disodium 1,2-dihydroxy-4-chlorobenzene-3,5-dicarboxylate, disodium 1,2-dihydroxy-6-chlorobenzene-3,5-dicarboxylate, 1,2-dihydroxybenzene-3,5-dicarboxylic acid, 1,2-dihydroxy-3-carboxylic acid, 1,2-dihydroxy-4-carboxylic acid, 1,2-dihydroxy-5-carboxylic acid, 1.2-dihydroxy-4-chlorobenzene-3,5-dicarboxylic acid, 1,2-dihydroxy-6-chlorobenzene-3,5-dicarboxylic acid, disodium 1,2-dihydroxybenzene-3,5-diphosphate, sodium 1,2-dihydroxy-3-phosphate, sodium 1,2-dihydroxy-4-phosphate, sodium 1,2-dihydroxy-5-phosphate, disodium 1,2-dihydroxy-4-chlorobenzene-3,5-diphosphate, disodium 1,2-dihydroxy-6-chlorobenzene-3,5-diphosphate, 1,2-dihydroxybenzene-3,5-diphosphoric acid, 1,2-dihydroxybenzene-3-phosphoric acid, 1,2-dihydroxybenzene-4-phosphoric acid, 1,2-dihydroxybenzene-5-phosphoric acid, 1,2-dihydroxy-4-chlorobenzene-3,5-diphosphoric acid, 1,2-dihydroxy-6-chlorobenzene-3,5-diphosphoric acid, dihexadecyl phosphate, monododecyl phosphate, and nafion (tetrafluoroethylene-perfluoro-3,6-dioxa-4-methyl-7-octenesulfonic acid copolymer).

10. The reverse osmosis separation membrane of claim 2, wherein the complex metal oxide having the meso-porous structure is prepared by a polymerization reaction of a precursor including at least one element selected from the group consisting of Si, Ti(IV), Zr(IV), Sn(IV) and Al(III) in the presence of a solvent and a surfactant.

11. The reverse osmosis separation membrane of claim 10, wherein the solvent is at least one selected from the group consisting of ethanol, water, isopropyl alcohol, methanol and ethyl acetate.

12. The reverse osmosis separation membrane of claim 10, wherein the surfactant is a nonionic surfactant represented by following Chemical Formula 3 or an ionic surfactant represented by following Chemical Formula 4, $$EO_X PO_Y EO_X$$ [Chemical Formula 3]

in Chemical Formula 3, x=5-40%, y=90-20%, 2x+y=100%, EO represents ethylene oxide, and PO represents propylene oxide, $$(C_nH_{2n+1})(CH_3)_3NX_1$$ [Chemical Formula 4]

in Chemical Formula 4, n=12 to 18, and $X_1$=Cl or Br.

13. The reverse osmosis separation membrane of claim 1, wherein the ultra-hydrophilic layer further comprises a silane coupling agent.

14. The reverse osmosis separation membrane of claim 1, wherein the ultra-hydrophilic layer further comprises a multi-functional organic material represented by following Chemical Formula 5, $$R^3(EO)_k R^4$$ [Chemical Formula 5]

in Chemical Formula 5, EO represents ethylene oxide, k represents an integer of 3 to 400, $R^3$ is selected from the group consisting of OH, (meth)acrylate having $C_1$ to $C_{15}$, di(meth)acrylate having $C_1$ to $C_{15}$, tri(meth)acrylate having $C_1$ to $C_{15}$, and vinyl having $C_1$ to $C_{15}$, and $R^4$ is selected from the group consisting of hydrogen, (meth)acrylate having $C_1$ to $C_3$, and vinyl having $C_1$ to $C_3$.

* * * * *